United States Patent [19]
Katz

[11] Patent Number: 5,843,554
[45] Date of Patent: Dec. 1, 1998

[54] MULTI-LAYER COVERING ARTICLES

[75] Inventor: Donald P. Katz, Carmel, Ind.

[73] Assignee: Katman, Inc., Indianapolis, Ind.

[21] Appl. No.: 198,603

[22] Filed: Feb. 18, 1994

[51] Int. Cl.$^6$ .................................................. B32B 1/04
[52] U.S. Cl. ............................... 428/68; 428/70; 428/74; 428/192; 428/703; 442/1; 442/62; 442/64; 442/101; 442/370; 442/348
[58] Field of Search ................ 428/68, 70, 247, 428/255, 284, 286, 192, 340, 85, 95, 74; 442/1, 62, 64, 101, 370, 398

[56] References Cited

U.S. PATENT DOCUMENTS

| | | | |
|---|---|---|---|
| Re. 17,739 | 7/1930 | Martin . | |
| 1,684,671 | 9/1928 | Hayden . | |
| 1,694,588 | 12/1928 | Finley et al. . | |
| 1,768,366 | 6/1930 | McKesson . | |
| 1,841,928 | 1/1932 | Anderson . | |
| 1,992,110 | 2/1935 | Wittenberg | 25/154 |
| 1,999,152 | 4/1935 | Finley | 25/154 |
| 2,003,988 | 6/1935 | Angier | 25/1 |
| 2,021,513 | 11/1935 | Levine | 25/154 |
| 2,024,727 | 12/1935 | Finley et al. | 154/50 |
| 2,033,989 | 3/1936 | Levine | 154/46 |
| 2,133,641 | 10/1938 | Tompkins | 25/1 |
| 2,275,272 | 3/1942 | Scripture, Jr. | 25/154 |
| 3,427,374 | 2/1969 | Jackson et al. | 264/79 |
| 4,035,543 | 7/1977 | Draper et al. | 428/245 |
| 4,423,694 | 1/1984 | Senneville | 112/405 |
| 4,485,137 | 11/1984 | White | 428/57 |
| 5,286,555 | 2/1994 | Reed | 428/703 |
| 5,362,542 | 11/1994 | Ozawa et al. | 428/70 |

FOREIGN PATENT DOCUMENTS

| | | |
|---|---|---|
| 29084/30 | 9/1730 | Australia . |
| 21177824 | 5/1990 | Japan . |
| 957684 | 6/1961 | United Kingdom . |

OTHER PUBLICATIONS

*Man–Made Fibres*, by R. W. Moncreiff, 1975, pp. 619–627.

Brochure of Max Katz Bag Co., Inc., Construction Products Division entitled "The Modern Wet Cure Method".

*Primary Examiner*—James J. Bell
*Attorney, Agent, or Firm*—Gerald H. Glanzman

[57] ABSTRACT

Multi-layer covering articles having a base layer adapted to yieldably conform to a surface to be covered and having properties appropriate for a particular application in which the article is to be used, and a thermoplastic surface layer bonded to a surface of the base layer and incorporating a reinforcing material to provide strength and tear resistance for the covering article. The reinforcing material permits the surface layer to function as the strength-providing member of the article, permitting the base layer to be designed solely in accordance with the requirements of a particular application without regard to its strength. Preferred embodiments of the invention include a concrete curing blanket in which the base layer includes a porous, non-woven synthetic fabric having optimum liquid retention and spreading properties and which is very thin and light in weight, and a solar heating swimming pool cover in which the base layer is formed of a plastic bubble sheet and the surface layer includes a black or other heat-absorbing color layer for heating water in the pool by conduction of solar energy therethrough. The reinforcing layer allows for lightweighting of the total product with the ability, if desired, to add dark and light (reflective) sides or the traditional translucent look in lightweight form.

49 Claims, 4 Drawing Sheets

MULTI-LAYER COVERING ARTICLES

BACKGROUND OF THE INVENTION

1. Field of the Invention

The present invention relates generally to multi-layer covering articles; and, more particularly, to multi-layer covering articles which include a base layer adapted to yieldably conform to a surface to be covered and having properties appropriate for the particular application in which the article is to be used; and a thermoplastic surface layer bonded to a surface of the base layer and incorporating a reinforcing material to provide strength and tear resistance for the article. Multi-layer covering articles according to the present invention include concrete curing blankets, swimming pool covers, pond liners, floor coverings, packaging, construction and insulation films and numerous other products.

2. Description of the Prior Art

It is well-known in the art of concrete construction that freshly poured concrete should cure slowly. Excessively rapid curing prevents proper hydration and tends to produce surface cracks and to decrease the overall strength of the concrete. To maximize the quality of the concrete, it should be kept wet after it has been laid for as long a period as practicable, for example, for a minimum of three to seven days. Although it can take as long as thirty days or more to achieve a maximum cure in a wet-cure process, the first three to seven days are most critical.

Early methods of wetting the surface of freshly laid concrete involved covering the concrete with a water retaining material such as straw, sand or burlap, and periodically sprinkling water on the material so as to maintain it in a wet condition. This procedure, obviously, was quite labor-intensive and expensive; and often resulted in the concrete being cured in an uneven manner.

In order to reduce labor requirements, and to generally improve the curing process, it has become the practice to use concrete curing blankets to cover water-wetted concrete and thereby extend the duration of the damp condition. In general, concrete curing blankets comprise a water retention base layer in contact with the concrete which functions to distribute and maintain water over the surface of the concrete; and a water impervious surface layer covering the base layer to reduce the rate of evaporation of the water and to reflect sunlight away from the blanket to maintain the water in contact with the concrete cooler and at a more uniform temperature.

A particularly well-known concrete curing blanket utilizes a fabric formed of woven burlap fibers as the base layer, and a thermoplastic sheet extrusion coated or melted onto the burlap fabric as a surface layer. This blanket was developed by Max Katz Bag Co., Inc. and has been widely used for many years; and, in fact, has become the standard product in the industry with respect to defining the necessary properties of a satisfactory wet-cure concrete curing blanket.

More recently, efforts have been made to utilize synthetic materials in concrete curing blankets. For example, U.S. Pat. No. 4,485,137 to White describes a concrete curing blanket in which a non-woven synthetic material is substituted for the burlap fabric base layer, and is covered with a thin film of water-impervious thermoplastic. The patent specifically describes a blanket having a base layer formed of non-woven, needle-punched polypropylene fabric having a weight of about four ounces per square yard, and a surface layer of low density polyethylene having a weight of about two ounces per square yard. The concrete curing blanket of the patent thus has a total weight of about six ounces per square yard as compared to burlap fabric blankets in which the burlap fabric base layer typically weighs about ten ounces per square yard and the thermoplastic layer weighs about three ounces per square yard for a total curing blanket weight of about thirteen ounces per square yard.

The use of synthetic materials in concrete curing blankets provides various advantages over the more traditional materials including a reduction in overall weight. However, existing synthetic blankets are not fully satisfactory. For example, in known concrete curing blankets, the base layer functions as the load-bearing or strength providing member of the blanket and thus must be of sufficient strength to protect the blanket against tearing or of otherwise being damaged during handling and use. This requires that the base layer be of sufficient weight and thickness to provide the required strength; and, thus, known synthetic concrete curing blankets continue to be rather cumbersome and difficult to handle. Also, the necessity of providing a base layer having sufficient strength limits the types of materials that can be used in forming the layer and thus restricts the manufacturer in his ability to design blankets possessing an optimum water retention capability and other desirable properties.

In addition to concrete curing blankets for facilitating the curing of freshly laid concrete, there are numerous other applications in which multi-layer covering articles are or can be used to cover a surface to achieve a particular objective. Exemplary of such multi-layer covering articles include swimming pool covers for heating the water in a swimming pool and/or for maintaining the pool at a desired temperature, pond liners for retaining water within a pond, floor coverings for providing a liquid absorbing and/or cushioned surface for walking and other purposes, and various films for numerous packaging, construction and insulation applications. In each of these applications, the covering article must be of sufficient strength to prevent the article from tearing or otherwise being easily damaged during handling and use; and this restricts the ability of the manufacturer in designing the covering article to maximize the properties desired to achieve the particular objective for which the article is to be used.

SUMMARY OF THE INVENTION

The present invention, according to one aspect thereof, provides a multi-layer covering article for covering a surface which comprises a base layer adapted to yieldably conform to a surface to be covered by the article and having desired properties for a particular application in which the article is to be used, and a thermoplastic surface layer bonded to a surface of the base layer, and incorporating a reinforcing material to provide strength and tear resistance for the article.

In accordance with the present invention, because a reinforcing material is incorporated into the surface layer of the covering article, the surface layer functions as the load-bearing or strength-providing member of the covering article. Accordingly, the base layer, which may itself be composed of one or a plurality of layers, need not function as a strength-providing member and may be designed solely in accordance with the requirements or objectives of the particular application in which the covering article is to be used.

According to one presently preferred embodiment, the present invention provides a covering article in the form of a concrete curing blanket which has superior water retention and spreading properties; and, at the same time, is relatively thin and light in weight and exceedingly strong and durable. A concrete curing blanket according to a presently preferred embodiment of the invention comprises a base layer of a porous, non-woven, synthetic fabric adapted to yieldably conform to a concrete surface to be covered by the blanket and having desired liquid retention and spreading properties to maintain the surface of the concrete in a wetted condition, and a surface layer covering a surface of the base layer and comprising a thermoplastic layer bonded to the base layer and incorporating a reinforcing material to provide strength and tear resistance for the blanket.

Because the base layer need not function as a strength-providing member of the blanket, it can be designed solely in accordance with the requirements or desired objectives of the particular application in which the blanket is to be used. For example, with the present invention, the base layer can be formed of materials having enhanced water retention and spreading properties without regard to the strength of the materials, and, thus, the a base layer can be made thinner and less dense, and therefore lighter than in conventional concrete curing blankets.

For example, as indicated above, a generally acceptable concrete curing blanket must have the water retention equivalent of a ten-ounce per square yard burlap fabric layer. The prior art usually required a synthetic base layer of at least four ounces per square yard to satisfy this requirement. With the present invention, on the other hand, where the strength of the base layer is not a limiting factor, a base layer formed of materials having superior water retention and spreading properties and having a weight of as little as two ounces per square yard or less can be used, thus significantly reducing the overall weight of the blanket and making the blanket much easier to handle and use.

According to a presently most preferred embodiment, a concrete curing blanket of the present invention includes a base layer of a non-woven, synthetic material such as polyester or a polyolefin, and including, but not limited to, low density polyethylene, linear low density polyethylene, high density polyethylene and polypropylene having sufficient water retention and spreading properties for a particular application. A particularly suitable base layer may utilize recently developed materials which are capable of swelling and retaining extremely large quantities of liquid, and of effectively spreading water through capillary action for use during the curing process. For example, one such known material, developed and patented by ARCO Chemical, Inc., and identified by the tradename "Fibersorb" comprises an absorbent material in fibrous form which is added to or used in conjunction with cushioning or non-absorbent fabrics to increase absorbency. This material becomes a gel-like substance after absorbing liquid and is used in products such as, for example, baby diapers and feminine hygiene products; and allows the absorbent layers thereof to be made very thin and more effective.

The surface layer most preferably comprises a layer of low density polyethylene, polypropylene or another suitable thermoplastic material incorporating a reinforcing material for increased strength and tear resistance. The surface layer is also preferably formed of a white opaque or other reflective material to effectively reflect sunlight therefrom.

The reinforcing material can comprise non-woven and/or woven scrim of fabric made from polyester, any polyolefin or other man-made material in the form of slit film tape, mono-filament or multi-filament yarn or extruded netting.

The blanket is preferably manufactured by extrusion coating, extrusion lamination, heat lamination or adhesive lamination of the base layer, surface layer and reinforcing material to produce the finished product.

In general, a concrete curing blanket of the present invention requires less material for its manufacture, thus generally reducing its overall manufacturing cost. Also, the reduction in weight made possible by the blanket of the present invention enables the blanket to be more easily handled and thus permits the blanket to be manufactured in larger sizes. In this regard, a currently popular blanket size is 10 feet by 100 feet. With the present invention, the ability to manufacture blankets of lighter weight materials will permit an increase in blanket size without loss in handling ability. In addition, the reduced amount of material facilitates its disposal, and all materials used may be formed of compatible materials so that the blanket may be readily recycled.

In accordance with a further aspect of the invention, concrete curing blankets and other covering articles are often manufactured in sections of preselected width and length; and, to cover a desired surface, the sections must be assembled to the appropriate size. For example, concrete curing blankets are typically manufactured in mats having a base width of five or six feet or a multiple thereof which are then assembled together to provide a blanket of desired size. As indicated above, a currently popular blanket size is 10 feet by 100 feet.

According to the present invention, mats are formed such that the surface layer extends beyond at least one edge of the base layer to define a flap for enabling adjacent mats to be sealed together in a light-tight, water-tight manner without it being necessary to overlap the base layers of the mats. The flaps can be extrusion seamed, heat-sealed or sewn together, and, most preferably, are extrusion seamed with clear or colored extrudate (see, for example, U.S. Trademark Registration No. 1,114,110 to a Color Stripe Design) of the same material as the surface layer to maximize the effectiveness of the seal.

According to a further important embodiment, a multi-layer covering article according to the present invention comprises a swimming pool cover for heating the water in a swimming pool to a desired temperature by solar energy. A solar heating swimming pool cover according to one embodiment of the present invention comprises a base layer including a bubble sheet, polyethylene or polypropylene foam or other suitable insulation material, and a thermoplastic surface layer bonded to the base layer. The base layer most preferably comprises a layer of clear, bubble sheet and the surface layer most preferably comprises a reinforced thermoplastic surface layer of black or other absorbent color on at least the surface thereof which is bonded to the base layer.

In use, a solar heating swimming pool cover, as described above, is positioned over the surface of a swimming pool with the bubble layer facing up and the surface layer in contact with the water. Solar energy will pass through the clear bubble layer and, in doing so, will heat up the entrapped gas in the bubble layer. In addition, the solar energy will impinge upon and be absorbed by the black or other absorbent color surface layer, and this energy will be spread out over the surface of the water and be transmitted into the water by conduction to heat up the water to a desired temperature.

According to an alternative embodiment of the invention, the surface layer may also include a white or other reflective color layer on the side opposite the black or other absorbent color layer. After the pool has been heated to a desired temperature, as described above, the cover can then be turned over such that the bubble layer is in contact with the water and the white or other reflective color layer of the surface layer faces the sun so as to substantially reflect solar energy and prevent further heating of the pool while the heated bubble layer in contact with the water will function as an insulation layer to maintain the temperature of the pool at the desired temperature.

A swimming pool cover of the present invention is also effective in helping to preserve necessary chemicals, such as chlorine, in the pool by reducing unnecessary exposure of the pool to sunlight which tends to dissipate such chemicals. The swimming pool cover of the present invention also helps to maintain the pool at a desired temperature in warmer climates thus reducing the need for atmospheric cooling.

In general, the swimming pool cover of the present invention helps reduce both heating and chemical requirements of the pool and this will provide a significant reduction in overall pool maintenance costs.

Plastic bubble sheets typically require a thickness of 8 to 12 mils for sufficient strength; however, by providing a reinforced surface layer according to the present invention, the thickness of the bubble sheet can be reduced significantly to also reduce overall cost and to facilitate handling without loss of effectiveness.

The covering article of the present invention can also be used in numerous other applications including as a pond liner wherein the base layer may comprise a puncture resistant material for retaining water in a pond, as a floor covering wherein the base layer may provide a cushioning and/or a liquid absorbing function and as a film for numerous packaging, construction and insulation applications.

Yet further applications and specific details and advantages of the present invention will become readily apparent hereinafter in conjunction with the following detailed description of presently preferred embodiments.

DETAILED DESCRIPTION OF THE PREFERRED EMBODIMENTS

Figure 1:
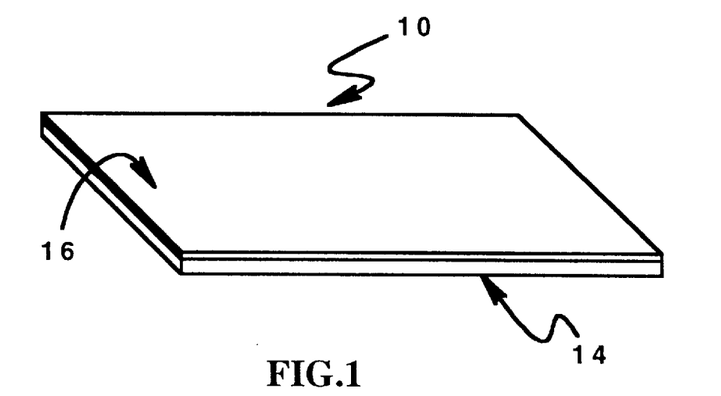
FIG. 1 is a perspective view of a section of a covering article in the form of a concrete curing blanket according to one presently preferred embodiment of the present invention.
Figure 2:
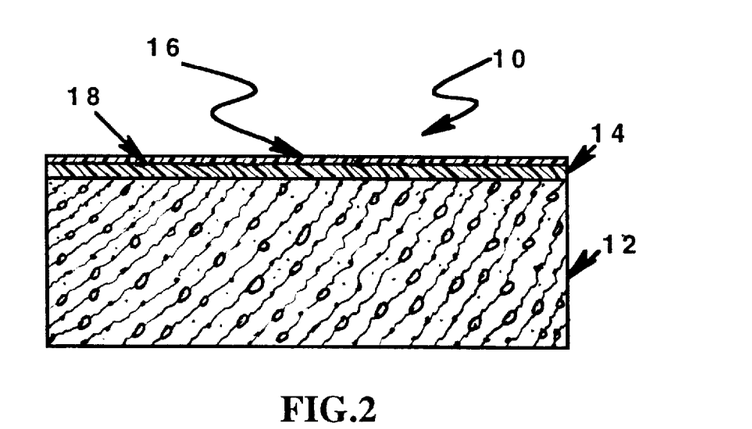
FIG. 2 is an enlarged cross-sectional view of the concrete curing blanket of FIG. 1 resting upon concrete undergoing a wet cure.
Figure 3:
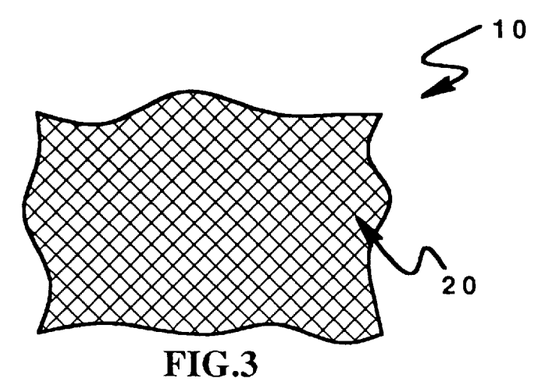
FIG. 3 is a top view of the concrete curing blanket of FIGS. 1 and 2.

FIGS. 1–3 illustrate a concrete curing blanket 10 according to one presently preferred embodiment of the invention.

Although not limited to any particular shape or size, concrete curing blankets are typically manufactured in mats of rectangular shape having a base width of five or six feet or a multiple thereof and a length of, for example, 100 feet; and are usually rolled up, with or without a tubular core, for shipping and easy handling by the user.

In use, the concrete curing blanket is adapted to be laid out over a section of freshly poured, and fully wetted concrete 12, and functions to maintain the concrete in a wetted condition for a sufficient period of time to effect proper wet-curing thereof.

As illustrated most clearly in FIG. 2, the concrete curing blanket of the present invention includes a water retention base layer 14 adapted to rest upon the surface of the concrete 12 to retain and distribute water over the surface of the concrete, and a water-impervious surface layer 16 which covers the base layer and functions to reduce the rate of evaporation of the water.

The base layer comprises a porous, resilient material which will readily conform to the surface of the concrete 12 being covered, and can be UV stabilized for extended outdoor use. The base layer 14 preferably comprises a layer of non-woven, synthetic material such as polyester or polyolefins including, but not limited to, low density polyethylene, linear low density polyethylene, high density polyethylene and polypropylene with or without a surfactant or other added absorbent, and having sufficient water retention and spreading properties for the particular application in which it is to be used.

A particularly important property of the base layer is that it have the capability of retaining at least the equivalent of a ten-ounce per square yard burlap fabric base layer. As will be explained hereinafter, because it is not necessary that the base layer of the present invention function as the load-bearing, strength providing member of the concrete curing blanket as in prior art blankets, the base layer can be formed as a layer of reduced thickness and weight while still providing an effective water retention and spreading capability to ensure proper curing of the concrete. In this regard, materials are now available on the market that are added to fabrics in order to make the fabrics capable of swelling and retaining substantially greater amounts of water than burlap fabric and of effectively spreading the water through capillary action thus evening the water distribution, and many of these products are especially suitable for use as or in the base layer in the present invention. For example, in one known product, an absorbent material developed and patented by ARCO Chemical, Inc., and identified by the trade name "Fibersorb," comprises an absorbent material in fibrous form which is added to or used in conjunction with cushioning or non-absorbent fabrics to increase their absorbency. This product becomes a gel-like substance after absorbing liquid and is used, for example, in baby diapers and feminine hygiene products; and allows the absorbent layers thereof to become very thin and more effective.

The surface layer 16 comprises a water-impervious thermoplastic material bonded to the top surface of the base layer; and, in accordance with the invention, comprises a reinforced surface layer which functions not only to help reduce the rate of evaporation of the water on the surface of the concrete, but also serves as the load-bearing or strength providing member of the blanket. Thus, as schematically illustrated in FIG. 2, the surface layer 16 includes a reinforcing material 18 therein to provide the surface layer (and the overall blanket) with superior strength and tear resistance.

The surface layer preferably comprises a thin layer of polyester or a polyolefin such as low density polyethylene or polypropylene or another suitable thermoplastic material; and incorporates a reinforcing material comprising non-woven and/or woven scrim made from any oriented or unoriented strength fiber such as polyester, any polyolefin or other man-made materials in the form of mono- or multi-filament yarn, slit film tape or extruded netting. Most preferably, the reinforcing material comprises a web 20 of woven or non-woven scrim-like material extruded within a thin polyethylene or polypropylene sheet surface layer having a thickness of about 1–4 mils as schematically illustrated in FIG. 3. The reinforcing material can be formed in a diamond pattern as illustrated in FIG. 3, in a square or random pattern, or in any other suitable strength-producing pattern. Preferably also, the surface layer is formed of a white opaque or other reflective surface material to reflect sunlight therefrom. Current concrete curing blanket specifications, call for the surface layer to be 0.004-inch opaque polyethylene, however, this can be reduced when and if specified.

The concrete curing blanket can be manufactured by extrusion coating or by extrusion, heat, or adhesive lamination processes; and is most preferably manufactured by extrusion coating the surface layer onto the base layer with the reinforcing material embedded within the surface layer during the process.

Because, in the present invention, the surface layer functions as the strength providing member of the concrete curing blanket, the base layer can be designed solely for its water retention and spreading properties and other desirable properties. Accordingly, the base layer of the concrete curing blanket of the invention can be made thinner and less dense than in conventional concrete curing blankets, and, by utilizing the high liquid retention materials referred to above that are now available, can be formed of materials which are as light as two ounces per square yard or less. The overall blanket, accordingly, is also thinner and lighter than known blankets and is therefore more convenient to transport and easier to spread out or otherwise handle. Although the incorporation of a reinforcing material into the surface layer increases manufacturing costs somewhat, this cost is normally more than offset by the ability to use less material for the base layer.

In many applications, a plurality of concrete curing blanket sections are needed to fully cover a concrete article, and it is necessary to position several blanket sections in side-by-side relation. Furthermore, adjacent blanket sections must be attached to one another in a light-tight and water-tight manner to maintain the effectiveness of the overall covering.

Figure 4:
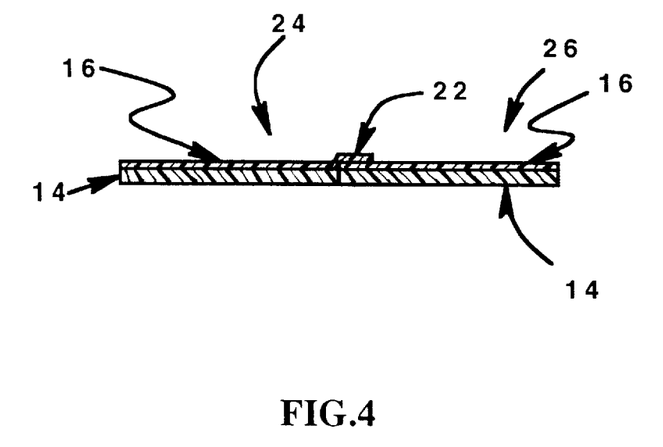
FIG. 4 is a cross-sectional view illustrating two concrete curing blanket sections bonded together.

According to a further aspect, the concrete curing blanket of the present invention includes a surface layer which extends outwardly beyond one or more edges of the base layer to provide an integral flap to facilitate attachment of the blanket to an adjacent blanket. More particularly, with reference to FIG. 4, the flap 22 extending from an edge of a blanket 24 can be extended over the surface layer 16 of an adjacent blanket 26, and then sealed to the surface layer without it being necessary to overlap the base layers of the blankets. The flap 22 can, for example, be attached to the surface layer of blanket 26 by extrusion seaming, heat sealing, hot air sealing, ultrasonic sealing, adhesive lamination or sewing to provide a water-tight and light-tight seal between adjacent blankets. Most preferably, the flap and surface layer of adjacent blankets are extrusion seamed to one another with a clear or colored extrudate of the same or compatible material as the surface layers so as to provide maximum sealing properties. In many prior art blankets, adjacent blankets are attached to one another using dissimilar materials which do not provide as satisfactory a seal and which reduce the recyclability of the product. In this regard, it is an important aspect of the present invention that the entire blanket including the base layer and the reinforced surface layer can conveniently be made of the same material so as to greatly facilitate the recyclability of the article.

As discussed previously, a concrete curing blanket is but one application of the covering article of the present invention. Another important application of the covering article of the invention is as a swimming pool cover, and FIGS. 5A and 5B schematically illustrate a covering article in the form of a solar heating swimming pool cover according to a second presently preferred embodiment of the invention.

The swimming pool cover is generally designated by reference number 30 and is adapted to rest upon the surface of the water of a swimming pool which is generally designated by reference number 32. The swimming pool cover 30, similar to the concrete curing blanket 10, comprises a base layer 34 and a surface layer 36 bonded to a surface of the base layer.

Figure 5A:
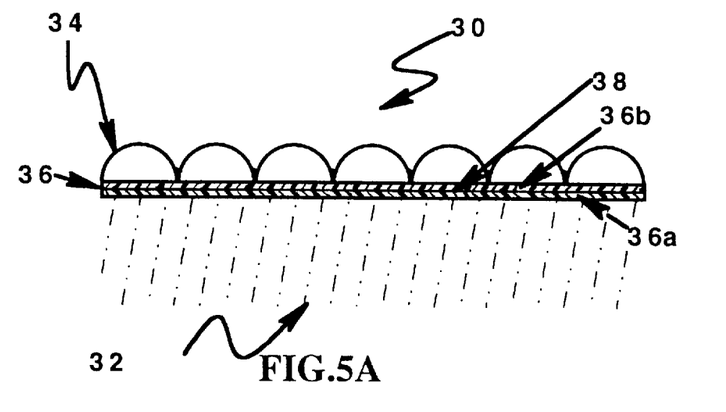
FIGS. 5A and 5B are enlarged cross-sectional views of a covering article in the form of a solar heating swimming pool cover according to a second presently preferred embodiment of the present invention.
Figure 5B:
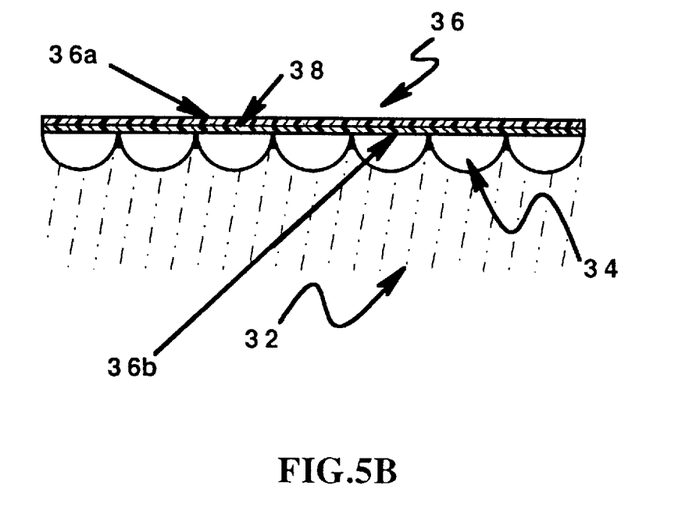

The base layer 34 preferably comprises a plastic bubble sheet of clear or of traditional translucent material (as schematically illustrated in FIGS. 5A and 5B) although it may also be formed of polyethylene or polypropylene foam or another suitable insulation material; and the surface layer 36 preferably comprises a reinforced thermoplastic layer bonded to the base layer.

The base layer according to a presently preferred embodiment includes a clear plastic bubble sheet having a single layer of bubbles formed therein entrapping air or another gas. The films used to make the surface layer can be monolayer or multiple-layer coextruded films which also contain barrier layers, such as nylon, as an oxygen barrier.

In the embodiment illustrated in FIGS. 5A and 5B, the surface layer comprises a multiple layer surface layer having a first layer 36a of a white or other reflective color and a second layer 36b of a black or other absorbent color with a reinforcing material or layer 38 bonded therebetween. This can be with or without a coextruded barrier layer as a particular application requires.

FIG. 5A illustrates use of the swimming pool cover 30 as a solar heating swimming pool cover. In FIG. 5A, the cover is placed on the surface of the swimming pool 32 with the clear bubble sheet of the base layer facing upwardly and with the surface layer 36 in contact with the surface of the water such that the white or other reflective color layer 36a thereof faces downwardly. Solar energy impinging upon the cover passes through the clear bubble layer heating the gas entrapped therein and is absorbed by the black or other absorbent color surface layer 36b. The absorbed heat is spread out over the surface of the pool by the surface layer and is transmitted to the water by conduction so as to effectively heat the water. The heated bubble sheet base layer functions as an insulating layer to help retain the water in the thusly heated condition.

After the pool has been heated to a desired temperature, the water can be maintained at that temperature by turning the cover over such that the white or other reflective color layer 36a of the surface layer faces upwardly and the bubble sheet of the base layer is in contact with the water as shown in FIG. 5B. In this orientation, the white or other reflective color layer will substantially reflect solar energy away from the cover to prevent further heating of the pool, while the bubble sheet in contact with the surface of the pool will function as an insulation layer to reduce heat loss from the pool and help maintain the pool at the desired temperature while saving the costs of chemicals such as chlorine that would otherwise be dissipated due to sunlight without the cover.

Although the use of plastic bubble sheets for cushioning and insulating purposes is well-known, such sheets are typically required to be manufactured in a thickness of, for example, 8–12 mils for sufficient strength, and are usually in translucent form and, thus, not suitable for both heating and temperature maintaining applications as the cover of the present invention. Also, by providing the covering article with a reinforced surface layer according to the present invention, the thickness of the bubble sheet and of the overall cover can be reduced significantly without loss of effectiveness.

In general, the solar heating swimming pool cover of the present invention provides an effective means for heating a swimming pool to a desired temperature, and for maintaining the pool at a desired temperature without the use of fossil fuels as required in most pool heaters. In addition, the cover is strong yet light in weight for easy handling. In this regard also, the cover can conveniently be manufactured in sections which are attached together as described above with respect to FIG. 4.

The covering article of the present invention can also readily be used in numerous other applications. For example, the covering article can be designed as a pond liner in which the base layer is formed of a puncture-resistant material to retain water in a pond, as an insulating, packaging or construction film for vertical or horizontal insulation protection or barrier applications, or as a floor covering in which the base layer is formed of a material to provide cushioning and/or liquid absorbing functions to absorb spills or oils, while the covering functions as a barrier that prevents the absorbed liquid from passing through the covering. In addition, the covering article of the invention can incorporate electrically conductive and/or static electricity dissipating materials as might be desired in many applications, for example, in wrapping electrical components.

Figure 6:
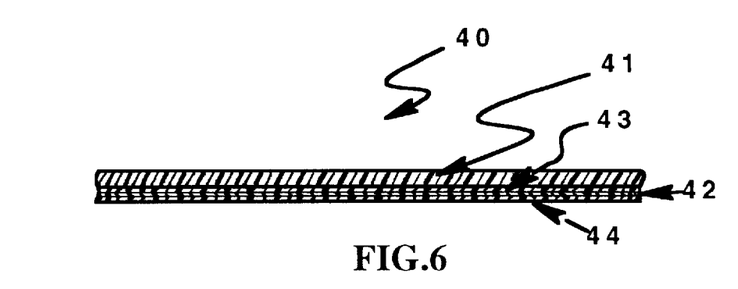
FIG. 6 is an enlarged cross-sectional view of a covering article in the form of a floor covering according to a third presently preferred embodiment of the present invention.

FIG. 6 schematically illustrates a covering article in the form of a floor covering (as used herein, the term "floor covering" is intended to cover mats and other articles adapted to cover not only floors within a building, but concrete and any other surfaces located both inside and outside of a building).

As shown in FIG. 6, the covering article, designated generally by reference number 40, comprises a base layer 41 of, for example, a needle-punch, staple fiber or melt-blown polypropylene fabrics for providing a cushioning and/or a liquid-absorbing function to absorb spills or oils, and a barrier layer 42 to prevent absorbed liquids from passing through the covering. An extrusion layer 43 is also illustrated for bonding the base layer to the barrier layer.

FIG. 6 also illustrates an anti-skid layer 44 which may be separately applied to the covering article to provide the article with anti-skid properties so as to prevent the article from slipping or shifting on the surface upon which it is used.

Figure 7:
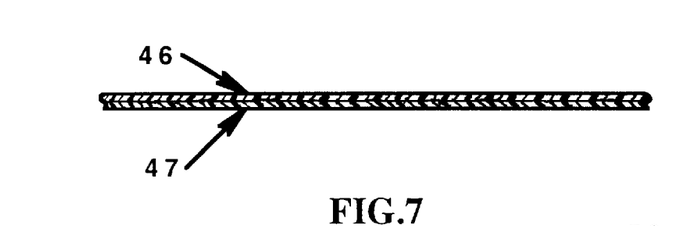
FIG. 7 is an enlarged cross-sectional view illustrating a modification of the floor covering of FIG. 6.

Alternatively, as illustrated in FIG. 7, an adhesive surface may be applied to the barrier layer to adhere the covering article to a surface. For example, as shown in FIG. 7, an adhesive material 46 having a release medium such as a silicone paper 47 thereon can be applied to the barrier layer 44 of FIG. 6 in place of the anti-skid layer. To use the article of FIG. 7, it is only necessary to remove the release medium 47 and adhere the covering article to any desired surface.

Figure 8:
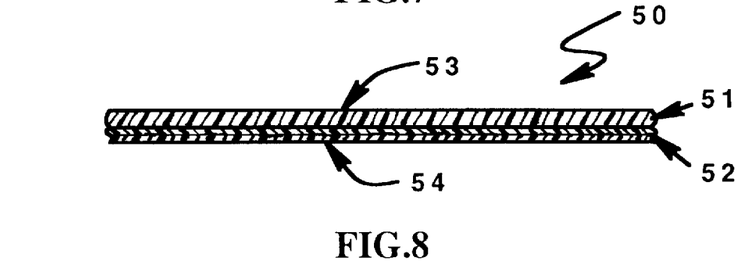
FIG. 8 is an enlarged cross-sectional view illustrating a fourth embodiment of the present invention.

FIG. 8 illustrates yet a further embodiment of the present invention. In particular, FIG. 8 illustrates an article 50 comprised of a coextruded layer 51, composed of, for example, from two to ten layers, and a reinforcing layer 52 separately applied to the coextruded layer 51 in order to provide the coextruded layer with strength and tear-resistance. Such an article is useful in numerous applications. For example, the coextruded layer may be provided with separate layers each providing suitable properties for desired applications, and the separately applied reinforcing layer provides the article with strength and tear-resistance. FIG. 8 illustrates the article as being provided with an outer surface 53 which can comprise a white or other reflective color surface and an outer surface 54 which can comprise a black or other absorbent color surface. Such an article can be used, for example, as a swimming pool cover as described previously as well as in numerous other applications.

In general, the covering article of the present invention can be readily designed for use in numerous covering applications, and in each such application, the base layer of the article can be designed to maximize the properties required or desired for the particular application in which the article is to be used without regard to its also functioning as the strength-providing or tear-resistant component of the covering article. In this regard also, the surface layer of the covering article also covers and protects the base layer so as to reduce the risk of damage to the base layer when the article is being handled or in use.

While what has been described constitutes presently preferred embodiments of the invention, it should be recognized that the invention could take numerous other forms. Therefore, it should be understood that the invention is to be limited only insofar as is required by the scope of the following claims.

I claim:

1. A multi-layer covering article for covering a surface comprising:

a base layer which is yieldably conformable to a surface to be covered by the covering article and having desired properties for a particular application; and a surface layer covering a surface of said base layer, said surface layer comprising a thermoplastic layer bonded to said base layer and incorporating a reinforcing material to provide strength and tear resistance for the covering article, said reinforcing material comprising a reinforcing scrim.

2. A multi-layer covering article for covering a surface comprising:

a base layer which is yieldably conformable to a surface to be covered by the covering article and having desired properties for a particular application; and a surface layer covering a surface of said base layer, said surface layer comprising a thermoplastic layer bonded to said base layer and incorporating a reinforcing material to provide strength and tear resistance for the covering article, wherein said surface layer includes a portion which extends beyond at least one edge of said base layer to define a flap means for overlapping and attachment to a surface layer of an adjacent covering article without overlapping of the base layers of the covering article and the adjacent covering article.

3. The covering article of claim 1 wherein said covering layer comprises a concrete curing blanket, and wherein said base layer comprises a base layer of a porous non-woven, synthetic fabric having desired liquid retention and spreading properties to maintain the surface of concrete in a wetted condition.

4. A multi-layer covering article for covering a surface, said multi-layer covering article comprising a concrete curing blanket and including:
- a base layer which is yieldably conformable to a surface to be covered by the covering article and having desired properties for a particular application, said base layer comprising a base layer of a porous non-woven, synthetic fabric having desired liquid retention and spreading properties to maintain the surface of concrete in a wetted condition, said fabric having an absorbent material added thereto to increase absorbency; and
- a surface layer covering a surface of said base layer, said surface layer comprising a thermoplastic layer bonded to said base layer and incorporating a reinforcing material to provide strength and tear resistance for the covering article.

5. The covering article of claim 1 wherein said covering article comprises a swimming pool cover.

6. A multi-layer covering article for covering a surface, said multi-layer covering article comprising a swimming pool cover and including:
- a base layer which is yieldably conformable to a surface to be covered by the covering article and having desired properties for a particular application, said base layer comprising a bubble plastic sheet; and
- a surface layer covering a surface of said base layer, said surface layer comprising a thermoplastic layer bonded to said base layer and incorporating a reinforcing material to provide strength and tear resistance for the covering article.

7. A multi-layer covering article for covering a surface, said multi-layer covering article comprising a swimming pool cover and including:
- a base layer which is yieldably conformable to a surface to be covered by the covering article and having desired properties for a particular application; and
- a surface layer covering a surface of said base layer, said surface layer comprising a thermoplastic layer bonded to said base layer and incorporating a reinforcing material to provide strength and tear resistance for the covering article, wherein said surface layer includes a portion which extends beyond at least one edge of said base layer to define a flap means for overlapping and attachment to a surface layer of an adjacent cover without overlapping of the base layers of the cover and adjacent cover.

8. The covering article of claim 1 wherein said covering article comprises a floor covering.

9. The covering article of claim 8 and further including a barrier layer for liquid retention.

10. A multi-layer covering article for covering a surface, said multi-layer covering article comprising a floor covering and including:
- a base layer which is yieldably conformable to a surface to be covered by the covering article and having desired properties for a particular application;
- a surface layer covering a surface of said base layer, said surface layer comprising a thermoplastic layer bonded to said base layer and incorporating a reinforcing material to provide strength and tear resistance for the covering article; and
- an anti-skid layer for preventing said article from slipping on a surface covered by said article.

11. A multi-layer covering article for covering a surface, said multi-layer covering article comprising a floor covering and including:
- a base layer which is yieldably conformable to a surface to be covered by the covering article and having desired properties for a particular application; and
- a surface layer covering a surface of said base layer, said surface layer comprising a thermoplastic layer bonded to said base layer and incorporating a reinforcing material to provide strength and tear resistance for the covering article, wherein said surface layer includes a portion which extends beyond at least one edge of said base layer to define a flap means for overlapping and attachment to a surface layer of an adjacent floor covering without overlapping of the base layers of the floor covering and adjacent floor covering.

12. A concrete curing blanket comprising:
- a base layer of a porous, non-woven, synthetic fabric which is yieldably conformable to a concrete surface to be covered by the blanket and having desired liquid retention and spreading properties to maintain the surface of the concrete in a wetted condition; and
- a surface layer covering a surface of said base layer, said surface layer comprising a thermoplastic layer bonded to said base layer and incorporating a reinforcing material to provide strength and tear resistance for the blanket, said reinforcing material comprising a reinforcing scrim.

13. The concrete curing blanket of claim 12 wherein said reinforcing scrim comprises an extruded scrim, and wherein said cover layer is extrusion coated onto said base layer.

14. The concrete curing blanket of claim 12 wherein said base layer comprises a non-woven synthetic fabric manufactured from polyester or a polyolefin including low density polyethylene, linear low density polyethylene, high density polyethylene or polypropylene.

15. The concrete curing blanket of claim 14 wherein said base layer has a weight of less than four ounces per square yard.

16. A concrete curing blanket comprising:
- a base layer of a porous, non-woven, synthetic fabric which is yieldably conformable to a concrete surface to be covered by the blanket and having desired liquid retention and spreading properties to maintain the surface of the concrete in a wetted condition; and
- a surface layer covering a surface of said base layer, said surface layer comprising a thermoplastic layer bonded to said base layer and incorporating a reinforcing material to provide strength and tear resistance for the blanket, wherein said surface layer includes a portion which extends beyond at least one edge of said base layer to define a flap means for overlapping and attachment to a surface layer of an adjacent blanket without overlapping of the base layers of the blanket and adjacent blanket.

17. A swimming pool cover comprising:
- a base layer which is yieldably conformable to a surface of a swimming pool to be covered by the cover and having desired heat-absorbing and heat retention properties, said base layer comprising a bubble plastic sheet; and
- a surface layer covering a surface of said base layer, said surface layer comprising a thermoplastic layer bonded to said base layer and incorporating a reinforcing material to provide strength and tear-resistance for the cover.

18. The swimming pool cover of claim 17 wherein said base layer includes a clear bubble plastic sheet and said surface layer includes a thermoplastic layer of black or other absorbent color, and wherein said cover is positionable on the surface of a swimming pool with the bubble plastic sheet facing upwardly and the surface layer in contact with the surface of the pool with the black or other absorbent color layer thereof facing upwardly whereby solar energy passes through said bubble plastic sheet and is absorbed by said black or other absorbent color layer of said surface layer for heating the swimming pool by conduction.

19. The swimming pool cover of claim 18 wherein said surface layer comprises a multiple layer surface layer including said black or other absorbent color layer and a white or other reflective color layer, and wherein said cover is positionable over said swimming pool with the plastic bubble sheet in contact with the surface of the pool and the white or other reflective color layer of said surface layer facing upwardly for reflecting solar energy away from said cover and said swimming pool for maintaining said swimming pool at a desired temperature.

20. A swimming pool cover comprising:

a base layer which is yieldably conformable to a surface of a swimming pool to be covered by the cover and having desired heat-absorbing and heat retention properties; and a surface layer covering a surface of said base layer, said surface layer comprising a thermoplastic layer bonded to said base layer, said surface layer comprising a multiple layer surface layer including a black or other absorbent color layer and a white or other reflective color layer, and wherein said cover is positionable on the surface of a swimming pool with the base layer facing upwardly and the surface layer in contact with the surface of the pool with the black or other absorbent color layer thereof facing upwardly whereby solar energy passes through said base layer and is absorbed by said black or other absorbent color layer of said surface layer for heating the swimming pool by conduction, and wherein said cover is positionable over said swimming pool with the base layer in contact with the surface of the pool and the white or other reflective color layer of said surface layer facing upwardly for reflecting solar energy away from said cover and said swimming pool for maintaining said swimming pool at a desire temperature.

21. The swimming pool cover of claim 20 wherein said surface layer incorporates a reinforcing material to provide strength and tear-resistance for the cover.

22. The swimming pool cover of claim 20 wherein said surface layer further includes one or more barrier layers for functioning as an oxygen barrier.

23. The swimming pool cover of claim 20 wherein said base layer comprises a clear bubble plastic sheet.

24. A covering article comprising:

a base layer which is yieldably conformable to a surface to be covered by the covering article, said base layer including cushioning and liquid absorbent properties;

a surface layer covering a surface of said base layer, said surface layer comprising a thermoplastic barrier layer bonded to said base layer for containing liquid absorbed by said base layer and for serving as a strength-provided layer for said article; and an anti-skid layer for preventing said covering article from sliding on said surface to be covered.

25. The covering article of claim 24 wherein said base layer comprises needle-punch, staple fiber polypropylene.

26. The covering article of claim 24 wherein said covering article comprises a floor covering.

27. The swimming pool cover of claim 17 wherein said bubble plastic sheet comprises a clear bubble plastic sheet.

28. The swimming pool cover of claim 17 wherein said bubble plastic sheet comprises a translucent bubble plastic sheet.

29. The swimming pool cover of claim 17 wherein said bubble plastic sheet comprises a black or other absorbent color bubble plastic sheet.

30. The swimming pool cover of claim 17 wherein said bubble plastic sheet comprises a white or other reflective color bubble plastic sheet.

31. The multi-layer covering article of claim 1 wherein at least one of said surface layer and said base layer of said article includes one or more coextruded thermoplastic films which comprise a plurality of coextruded layers, said plurality of coextruded layers including one or more barrier layers for functioning as barriers for specific materials.

32. The multi-layer covering article of claim 31 wherein said one or more barrier layers includes an oxygen barrier layer.

33. The swimming pool cover of claim 17 wherein at least one of said surface layer and said base layer of said cover includes one or more coextruded thermoplastic films which comprise a plurality of coextruded layers, said plurality of coextruded layers including one or more barrier layers for functioning as barriers for specific materials.

34. The swimming pool cover of claim 33 wherein said one or more barrier layers includes an oxygen barrier layer.

35. The multi-layer covering article of claim 31 wherein both said surface layer and said base layer of said article includes said one or more coextruded thermoplastic films.

36. The swimming pool cover of claim 33 wherein both said surface layer and said base layer of said cover includes said one or more coextruded thermoplastic films.

37. The covering article of claim 5 wherein at least one of said base layer and said surface layer includes one or more coextruded thermoplastic films which comprise a plurality of coextruded layers.

38. The covering article of claim 37 wherein said one or more coextruded films includes a clear film.

39. The covering article of claim 37 wherein said one or more coextruded films includes a black or other absorbent color layer.

40. The covering article of claim 37 wherein said one or more coextruded films includes a white or other reflective color layer.

41. The covering article of claim 37 wherein said one or more coextruded films includes a black or other absorbent color layer facing toward one side of said article and a white or other reflective color layer facing toward a side of said article opposite said one side.

42. The covering article of claim 5 wherein said surface layer includes a white or other reflective color layer, and wherein said cover is positionable over a swimming pool with the base layer in contact with a surface of the pool and the white or other reflective color layer of said surface layer facing upwardly for reflecting solar energy away from said covering article and said swimming pool for maintaining said pool at a desired temperature.

43. The covering article of claim 5 wherein one of said base layer and said surface layer comprises a black or other absorbent color layer and the other of said base layer and said surface layer comprises a white or other reflective color layer, and wherein said swimming pool cover is positionable over a swimming pool either with the black or other absorbent color layer thereof facing upwardly for absorbing solar energy for heating the swimming pool by conduction, or with the white or other reflective color layer thereof facing upwardly for reflecting solar energy away from the covering article and said pool for maintaining said swimming pool at a desired temperature.

44. The covering article of claim 5 wherein said base layer includes a coextruded formed layer.

45. The swimming pool cover of claim 17 wherein said surface layer includes a white or other reflective color layer, and wherein said cover is positionable over said swimming pool with the base layer in contact with the surface of said pool and the white or other reflective color layer of said surface layer facing upwardly for reflecting solar energy away from said cover and said swimming pool for maintaining said swimming pool at a desired temperature.

46. The swimming pool cover of claim 20 wherein said base layer includes a coextruded foamed layer.

47. The swimming pool cover of claim 46 wherein said coextruded foamed layer includes a polyethylene or polypropylene foamed layer.

48. The covering article of claim 1 wherein said base layer includes a foamed layer.

49. The covering article of claim 1 wherein said base layer includes a bubble plastic sheet.

* * * * *